US012694465B2

(12) United States Patent
Guan

(10) Patent No.: US 12,694,465 B2
(45) Date of Patent: Jul. 28, 2026

(54) PICTURE UPDATING METHOD, INTERNET-OF-THINGS TERMINAL AND INTERNET-OF-THINGS SYSTEM

(71) Applicant: BOE TECHNOLOGY GROUP CO., LTD., Beijing (CN)

(72) Inventor: Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 214 days.

(21) Appl. No.: 18/282,000

(22) PCT Filed: Aug. 24, 2022

(86) PCT No.: PCT/CN2022/114477
§ 371 (c)(1),
(2) Date: Sep. 14, 2023

(87) PCT Pub. No.: WO2023/045684
PCT Pub. Date: Mar. 30, 2023

(65) Prior Publication Data
US 2024/0062327 A1 Feb. 22, 2024

(30) Foreign Application Priority Data

Sep. 24, 2021 (CN) .......................... 202111121501.1

(51) Int. Cl.
*G06T 1/60* (2006.01)
*G06F 3/147* (2006.01)
*G16Y 30/00* (2020.01)
(52) U.S. Cl.
CPC ............... *G06T 1/60* (2013.01); *G06F 3/147* (2013.01); *G16Y 30/00* (2020.01)

(58) Field of Classification Search
CPC ........................................................ G06T 1/60
See application file for complete search history.

(56) References Cited

U.S. PATENT DOCUMENTS

2013/0041747 A1* 2/2013 Anderson .......... H04N 21/8133
715/733
2013/0117703 A1 5/2013 Jang et al.
(Continued)

FOREIGN PATENT DOCUMENTS

CN 102193616 A 9/2011
CN 103197848 A 7/2013
(Continued)

*Primary Examiner* — Shivang I Patel
(74) *Attorney, Agent, or Firm* — WHDA, LLP

(57) ABSTRACT

An Internet-of-Things terminal includes: a communication unit, configured to receive text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures; a microcontroller unit, connected to the communication unit and configured to convert the text picture information into a picture to be displayed, where the picture to be displayed includes the page number information; a storage unit, connected to the microcontroller unit and configured to store the picture to be displayed; and a display unit connected to the microcontroller unit.

11 Claims, 4 Drawing Sheets

(56) References Cited

U.S. PATENT DOCUMENTS

| | | | | |
|---|---|---|---|---|
| 2013/0229371 | A1* | 9/2013 | Lee | G06F 3/0483 |
| | | | | 345/173 |
| 2014/0009479 | A1* | 1/2014 | Ishida | G06T 1/60 |
| | | | | 345/531 |
| 2014/0215340 | A1* | 7/2014 | Shetty | G06F 3/167 |
| | | | | 715/810 |
| 2017/0187658 | A1 | 6/2017 | Ryu et al. | |
| 2020/0045546 | A1 | 2/2020 | Zhou | |
| 2021/0382866 | A1* | 12/2021 | Wouda | G06F 16/909 |

FOREIGN PATENT DOCUMENTS

| | | | |
|---|---|---|---|
| CN | 108432260 A | 8/2018 |
| CN | 109756450 A | 5/2019 |
| CN | 113703710 A | 11/2021 |

* cited by examiner

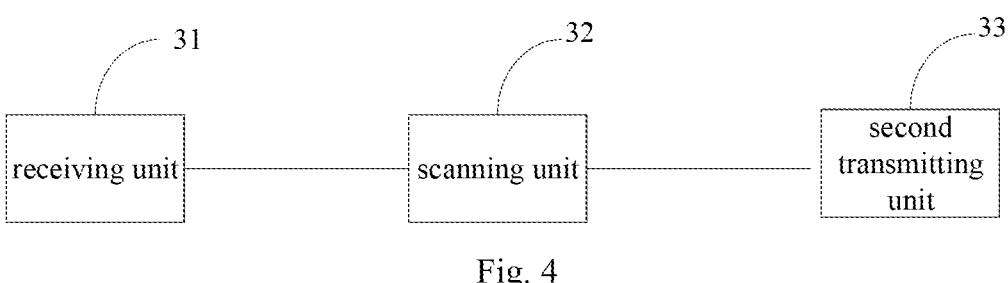

Fig. 4

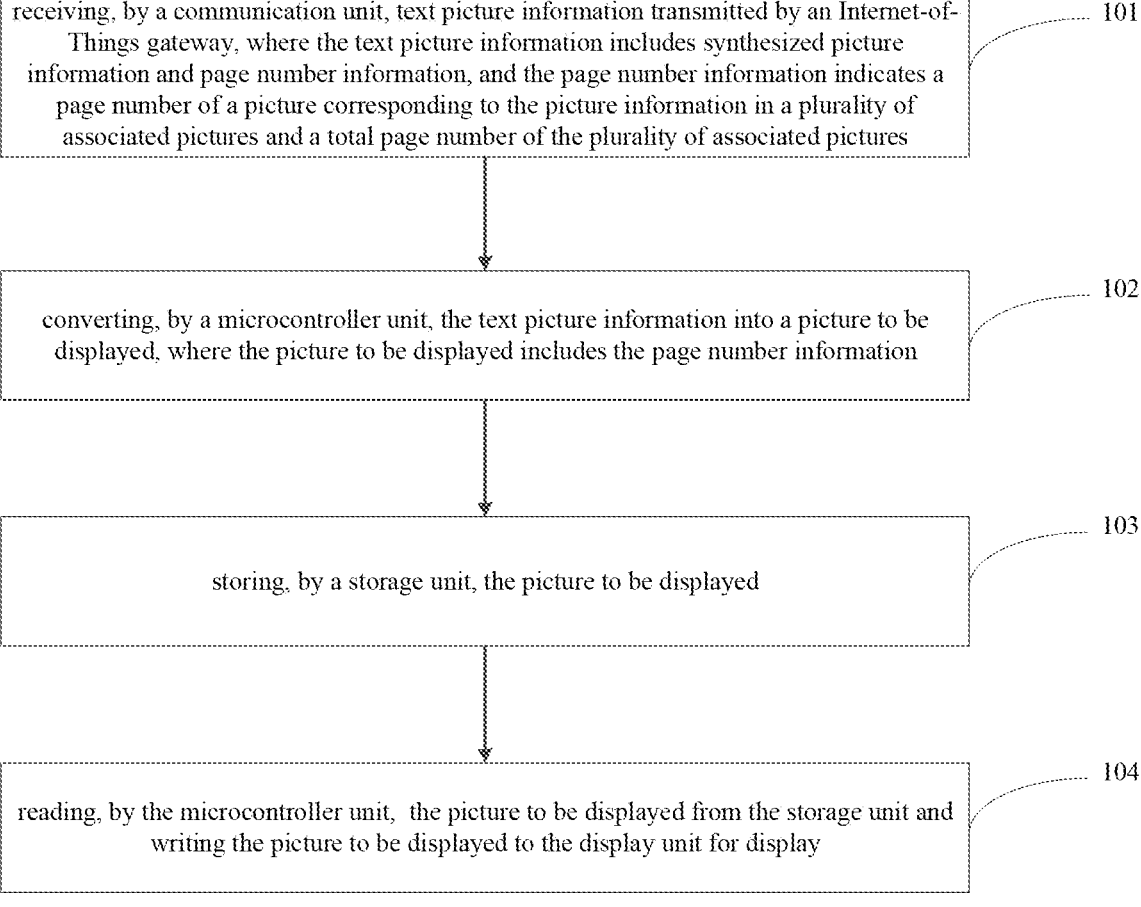

receiving, by a communication unit, text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures — 101 converting, by a microcontroller unit, the text picture information into a picture to be displayed, where the picture to be displayed includes the page number information — 102 storing, by a storage unit, the picture to be displayed — 103 reading, by the microcontroller unit, the picture to be displayed from the storage unit and writing the picture to be displayed to the display unit for display — 104

Fig. 5

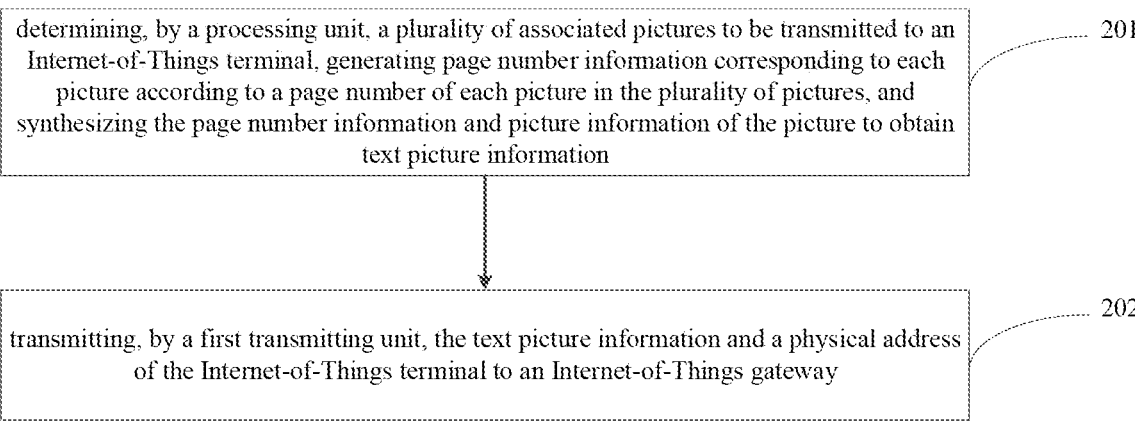

determining, by a processing unit, a plurality of associated pictures to be transmitted to an Internet-of-Things terminal, generating page number information corresponding to each picture according to a page number of each picture in the plurality of pictures, and synthesizing the page number information and picture information of the picture to obtain text picture information — 201 transmitting, by a first transmitting unit, the text picture information and a physical address of the Internet-of-Things terminal to an Internet-of-Things gateway — 202

Fig. 6

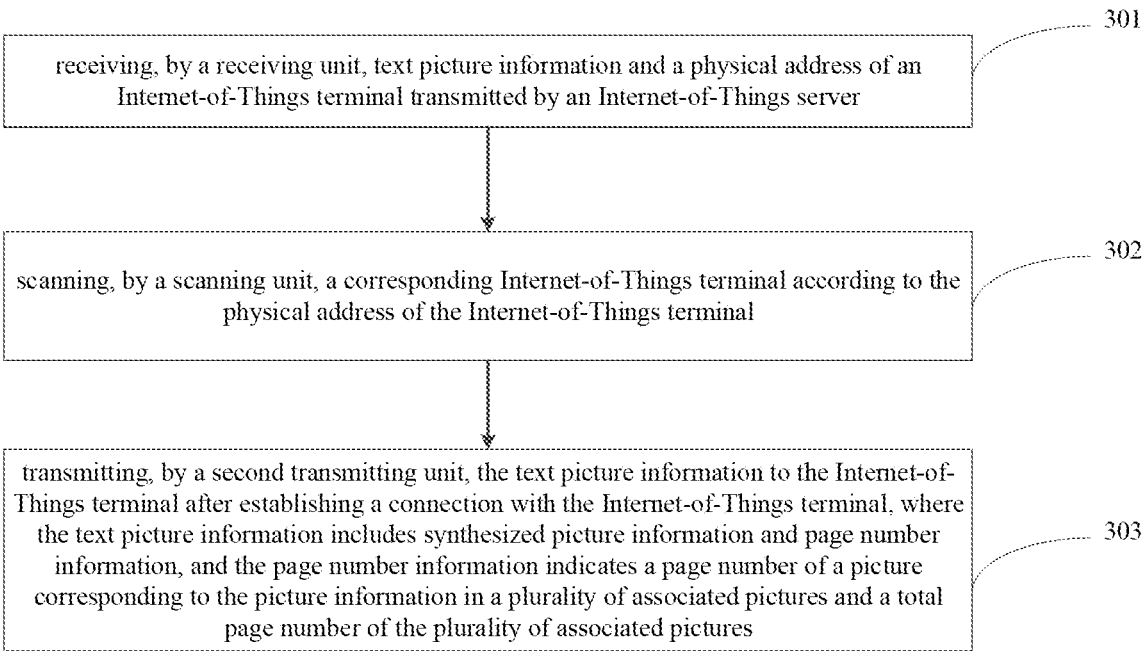

receiving, by a receiving unit, text picture information and a physical address of an Internet-of-Things terminal transmitted by an Internet-of-Things server — 301 scanning, by a scanning unit, a corresponding Internet-of-Things terminal according to the physical address of the Internet-of-Things terminal — 302 transmitting, by a second transmitting unit, the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures — 303

Fig. 7

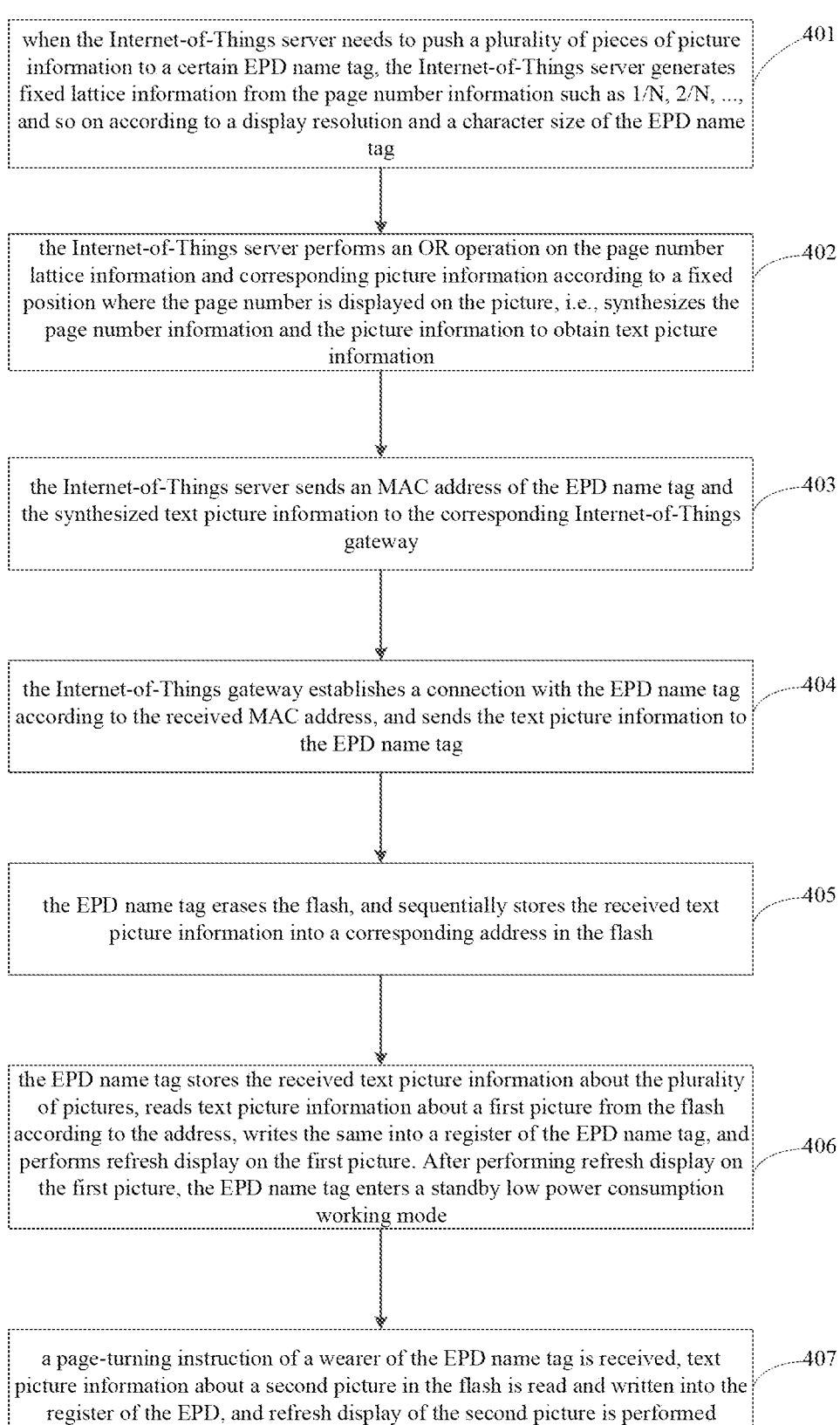

when the Internet-of-Things server needs to push a plurality of pieces of picture information to a certain EPD name tag, the Internet-of-Things server generates fixed lattice information from the page number information such as 1/N, 2/N, ..., and so on according to a display resolution and a character size of the EPD name tag — 401 the Internet-of-Things server performs an OR operation on the page number lattice information and corresponding picture information according to a fixed position where the page number is displayed on the picture, i.e., synthesizes the page number information and the picture information to obtain text picture information — 402 the Internet-of-Things server sends an MAC address of the EPD name tag and the synthesized text picture information to the corresponding Internet-of-Things gateway — 403 the Internet-of-Things gateway establishes a connection with the EPD name tag according to the received MAC address, and sends the text picture information to the EPD name tag — 404 the EPD name tag erases the flash, and sequentially stores the received text picture information into a corresponding address in the flash — 405 the EPD name tag stores the received text picture information about the plurality of pictures, reads text picture information about a first picture from the flash according to the address, writes the same into a register of the EPD name tag, and performs refresh display on the first picture. After performing refresh display on the first picture, the EPD name tag enters a standby low power consumption working mode — 406 a page-turning instruction of a wearer of the EPD name tag is received, text picture information about a second picture in the flash is read and written into the register of the EPD, and refresh display of the second picture is performed — 407

Fig. 8

PICTURE UPDATING METHOD, INTERNET-OF-THINGS TERMINAL AND INTERNET-OF-THINGS SYSTEM

CROSS-REFERENCE TO RELATED APPLICATIONS

The present application is the U.S. national phase of International Application No. PCT/CN2022/114477 filed on Aug. 24, 2022. International Application No. PCT/CN2022/114477 claims priority to Chinese Patent Application No. 202111121501.1 filed in China on Sep. 24, 2021. Each of the above-listed applications is hereby incorporated in its entirety by reference.

TECHNICAL FIELD

The present disclosure relates to the field of display technology, in particular to a picture updating method, an Internet-of-Things terminal and an Internet-of-Things system.

BACKGROUND

Among Internet-of-Things applications, an EPD (electrophoretic display technology) terminal is an Internet-of-Things terminal using an electronic ink screen for display, has an EPD screen with low power consumption, and a MCU (microcontroller unit) as a controller. The MCU has a very low power consumption, but the processing capability and internal resources thereof are limited, so it is unable to conveniently display multiple pictures.

SUMMARY

An object of the present disclosure is to provide a picture updating method, an Internet-of-Things terminal and an Internet-of-Things system, so as to enable an Internet-of-Things terminal with low power consumption to realize a picture processing.

In order to achieve the above object, technical solutions in the embodiments of the present disclosure are provided as follows.

There is provided an Internet-of-Things terminal, including:

a communication unit, configured to receive text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures;

a microcontroller unit, connected to the communication unit and configured to convert the text picture information into a picture to be displayed, where the picture to be displayed includes the page number information;

a storage unit, connected to the microcontroller unit and configured to store the picture to be displayed, and a display unit connected to the microcontroller unit;

where the microcontroller unit is further configured to read the picture to be displayed from the storage unit and write the picture to be displayed to the display unit for display.

In some embodiments of the present disclosure, the text picture information includes a plurality of pieces of information, and each piece of information includes picture information and page number information corresponding to the picture information;

the communication unit is further configured to receive the plurality of pieces of information;

the microcontroller unit is further configured to correspondingly convert the plurality of pieces of information into a plurality of pictures to be displayed;

the storage unit is further configured to store the plurality of pictures to be displayed, and corresponding storage areas of the plurality of pictures to be displayed in the storage unit are independent of each other;

the microcontroller unit is further configured to, according to a page-turning instruction from a user, read a picture to be displayed corresponding to the page-turning instruction from a corresponding storage area in the storage unit, and write the picture to be displayed corresponding to the page-turning instruction into the display unit for display.

In some embodiments of the present disclosure, the storage unit is further configured to compare a current remaining storage capacity with a size of the picture to be displayed, and in response to that the current remaining storage capacity is less than the size of the picture to be displayed, erase information that is already stored until the current remaining storage capacity is not less than the size of the picture to be displayed.

In some embodiments of the present disclosure, the microcontroller unit is further configured to determine whether the page-turning instruction is received after reading the picture to be displayed from the storage unit and writing the picture to be displayed into the display unit for display, and in response to that the page-turning instruction is not received, control the Internet-of-Things terminal to enter a low power consumption standby mode; in response to that the page-turning instruction is received, read a picture to be displayed corresponding to the page-turning instruction from the storage unit according to the page-turning instruction, and write the picture to be displayed corresponding to the page-turning instruction to the display unit for display.

The present disclosure further provides in some embodiments an Internet-of-Things server, including:

a processing unit, configured to determine a plurality of associated pictures to be transmitted to an Internet-of-Things terminal, generate page number information corresponding to each picture according to a page number of each picture in the plurality of pictures, and synthesize the page number information and picture information of the picture to obtain text picture information; and a first transmitting unit, configured to transmit the text picture information and a physical address of the Internet-of-Things terminal to an Internet-of-Things gateway.

In some embodiments of the present disclosure, the text picture information includes a plurality of pieces of information, and each piece of information includes picture information and page number information corresponding to the picture information. The first transmitting unit is further configured to transmit the plurality of pieces of information to the Internet-of-Things gateway sequentially according to the page number information.

The present disclosure further provides in some embodiments an Internet-of-Things gateway, including:

a receiving unit, configured to receive text picture information and a physical address of an Internet-of-Things terminal transmitted by an Internet-of-Things server;

a scanning unit, configured to scan a corresponding Internet-of-Things terminal according to the physical address of the Internet-of-Things terminal; and a second transmitting unit, configured to transmit the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures.

In some embodiments of the present disclosure, the text picture information includes a plurality of pieces of information, and each piece of information includes picture information and page number information corresponding to the picture information. The second transmitting unit is further configured to transmit the plurality of pieces of information to the Internet-of-Things terminal sequentially according to the page number information.

The present disclosure further provides in some embodiments a picture updating method applied to the abovementioned Internet-of-Things terminal, the picture updating method including:

receiving, by a communication unit, text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures;

converting, by a microcontroller unit, the text picture information into a picture to be displayed, where the picture to be displayed includes the page number information;

storing, by a storage unit, the picture to be displayed; and reading, by the microcontroller unit, the picture to be displayed from the storage unit and writing the picture to be displayed to the display unit for display.

The present disclosure further provides in some embodiments a picture updating method applied to the abovementioned Internet-of-Things server, the picture updating method including:

determining, by a processing unit, a plurality of associated pictures to be transmitted to an Internet-of-Things terminal, generating page number information corresponding to each picture according to a page number of each picture in the plurality of pictures, and synthesizing the page number information and picture information of the picture to obtain text picture information; and transmitting, by a first transmitting unit, the text picture information and a physical address of the Internet-of-Things terminal to an Internet-of-Things gateway.

The present disclosure further provides in some embodiments a picture updating method applied to the abovementioned Internet-of-Things gateway, including:

receiving, by a receiving unit, text picture information and a physical address of an Internet-of-Things terminal transmitted by an Internet-of-Things server;

scanning, by a scanning unit, a corresponding Internet-of-Things terminal according to the physical address of the Internet-of-Things terminal; and transmitting, by a second transmitting unit, the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures.

The present disclosure further provides in some embodiments an Internet-of-Things system, including:

an Internet-of-Things server, configured to determine a plurality of associated pictures to be transmitted to an Internet-of-Things terminal, generate page number information corresponding to each picture according to a page number of each picture in the plurality of pictures, and synthesize the page number information and picture information of the picture to obtain text picture information; and transmit the text picture information and a physical address of the Internet-of-Things terminal to an Internet-of-Things gateway;

an Internet-of-Things gateway, configured to receive text picture information and a physical address of an Internet-of-Things terminal transmitted by an Internet-of-Things server; scan a corresponding Internet-of-Things terminal according to the physical address of the Internet-of-Things terminal; and transmit the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures; and an Internet-of-Things terminal, configured to receive text picture information transmitted by the Internet-of-Things gateway, where the text picture information includes synthesized picture information and page number information, and the page number information indicates the page number of the picture corresponding to the picture information in the plurality of associated pictures and the total page number of the plurality of associated pictures; convert the text picture information into a picture to be displayed, where the picture to be displayed includes the page number information; store the picture to be displayed, and read the picture to be displayed for display.

BRIEF DESCRIPTION OF THE DRAWINGS

FIG. 4 is a schematic view showing an Internet-of-Things gateway according to an embodiment of the present disclosure:

FIG. 5 is a flowchart of a picture updating method applied to the Internet-of-Things terminal according to an embodiment of the present disclosure;

FIG. 6 is a flowchart of a picture updating method applied to the Internet-of-Things server according to an embodiment of the present disclosure;

FIG. 7 is a flowchart of a picture updating method applied to the Internet-of-Things gateway according to an embodiment of the present disclosure; and FIG. 8 is a flowchart of a picture updating method according to an embodiment of the present disclosure.

DETAILED DESCRIPTION

Figure 1:
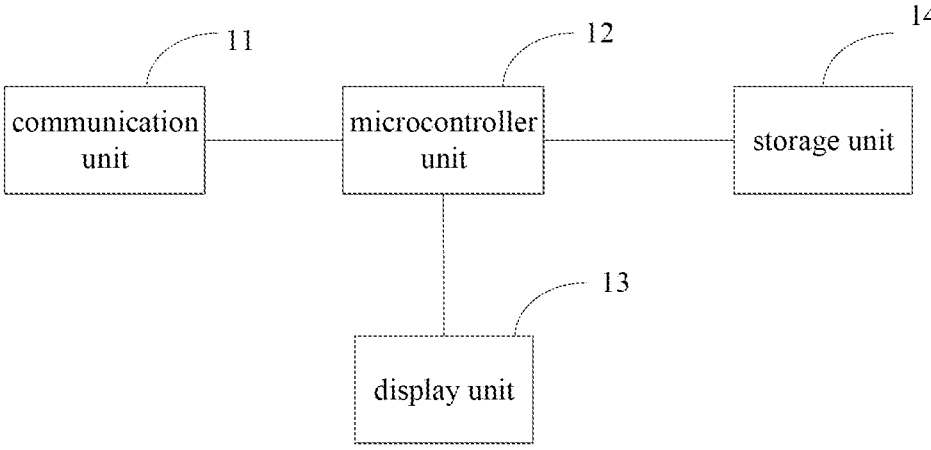
FIG. 1 is a schematic view showing an Internet-of-Things terminal according to an embodiment of the present disclosure.

In order to make the technical problems to be solved, the technical solutions and the advantages of the embodiments of the present disclosure more apparent, a detailed description will be given below with reference to the drawings and specific embodiments.

Near field wireless communication is mostly used between an Internet-of-Things terminal and an Internet-of-Things gateway, the Internet-of-Things gateway transmits information reported by the Internet-of-Things terminal to an Internet-of-Things server via a wired network or a mobile network, the Internet-of-Things server transmits information to the Internet-of-Things gateway, and the Internet-of-Things terminal via the Internet-of-Things gateway, and the information is displayed on the Internet-of-Things terminal. A specific application of an Internet-of-Things terminal may be a hospital bedside card which is positioned at a patient bedside and is used for displaying patient information. Another specific application of the Internet-of-Things terminal may be a name tag terminal for displaying employee information. Another specific application of the Internet-of-Things terminal may be a doorplate of a ward or a conference room or the like for displaying corresponding information in the ward or the conference room. The information displayed on the Internet-of-Things terminal is transmitted to the Internet-of-Things terminal through the Internet-of-Things server-Internet-of-Things gateway.

When displaying a picture, picture information is pushed to the Internet-of-Things terminal through the Internet-of-Things server-Internet-of-Things gateway. In other words, the Internet-of-Things server transmits a content displayed on the Internet-of-Things terminal to the Internet-of-Things terminal through the Internet-of-Things gateway in a picture data format, and the Internet-of-Things terminal stores the received picture data in a flash on a circuit board of the Internet-of-Things terminal. When a content of a display message is a single picture, the Internet-of-Things terminal may directly display the picture information. When the Internet-of-Things server pushes pieces of associated picture information, the Internet-of-Things terminal may directly display a first picture that a user is capable of seeing. With regard to the remaining pictures, the user is reminded of other pictures by means of an LED flashing indication, and after seeing, the user may operate the Internet-of-Things terminal by pressing a key to display the other pictures. Since a LED indicator has a current of a few mA, for an Internet-of-Things terminal with low power consumption requirements, the LED indicator is not able to flash for a long time, and only flashes regularly and then is turned off. In a case that the user does not see the flashing LED indicator in time, since the LED indicator flashes at regular intervals and then is turned off, the user will not know that there are other pictures. In a case that the user confirms whether there are other pictures by randomly pressing a page-turning key, it not only causes the Internet-of-Things terminal to switch from a low-power-consumption sleep state to a normal working mode, with a certain amount of energy consumption, resulting in reducing the standby time of the Internet-of-Things terminal, but also causes a bad user experience to the user.

The embodiments of the present disclosure provide a picture updating method, an Internet-of-Things terminal and an Internet-of-Things system, so as to enable an Internet-of-Things terminal with low power consumption to realize a picture processing.

The present disclosure provides in some embodiments an Internet-of-Things terminal, as shown in FIG. 1, including:

a communication unit 11, configured to receive text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures; the communication unit 11 may receive the text picture information in a wireless manner such as radio frequency and Bluetooth, or may receive the text picture information in a wired manner;

a microcontroller unit 12, connected to the communication unit 11 and configured to convert the text picture information into a picture to be displayed, where the picture to be displayed includes the page number information;

a storage unit 13, connected to the microcontroller unit 12 and configured to store the picture to be displayed; and a display unit 14 connected to the microcontroller unit;

where the microcontroller unit 12 is further configured to read the picture to be displayed from the storage unit 13 and write the picture to be displayed to the display unit 14 for display.

In the embodiment of the present disclosure, the text picture information received by the communication unit includes the page number information, the microcontroller unit converts the text picture information received by the communication unit into the picture to be displayed and stores the same in the storage unit. Next, the microcontroller unit writes the picture to be displayed stored in the storage unit to the display unit for display, and the picture displayed by the display unit includes a picture having a page number. In this way, it is able for an Internet-of-Things user to know a sequence number of a currently displayed picture and how many associated pictures are there in addition to the currently displayed picture, so as to remind the user of other associated pictures without using a LED flashing indication, thereby to reduce the power consumption of the Internet-of-Things terminal and improve the standby time of the Internet-of-Things terminal. In the embodiment of the present disclosure, it may further be able to improve the user experience.

In a specific example, the communication unit 11 is a radio frequency chip, and may communicate with the Internet-of-Things gateway in a wireless manner, and receive the text picture information through the Internet-of-Things gateway interacting with the Internet-of-Things server. The Internet-of-Things gateway may perform a near field wireless communication, and may be connected to the Internet-of-Things server via a wireless network or a wired network.

The storage unit 13 is used for information storage and information buffering during the text picture information processing. The storage unit 13 may be implemented in various types of storage devices, and in some embodiments of the present disclosure, the storage unit 13 may be a flash, and a main characteristic of the flash is that the stored information may be maintained for a long time in a deenergized state. The flash is an EEPROM (Electrically Erasable Programmable Read Only Memory), has a high access speed, is easy to be erased and rewritten, has a small power consumption, and is applied to the Internet-of-Things terminal with low power consumption. The storage unit 13 is not limited to the flash, and may be an erasable programmable memory device in another type.

In some embodiments of the present disclosure, the display unit 14 is an electronic ink screen. The electronic ink screen has a small power consumption, and is applied to the Internet-of-Things terminal with low power consumption. The display unit 14 is not limited to the electronic ink screen, and may be a low power consumption display device in another type.

In the embodiment of the present disclosure, the microcontroller unit 12 may be connected to the communication unit 11 via a serial peripheral interface (SPI), the microcontroller unit 12 may be connected to the storage unit 13 via a serial peripheral interface (SPI), the microcontroller unit 12 may be connected to the display unit 14 via a serial peripheral interface, and the serial peripheral interface is a synchronous peripheral interface that enables the microcontroller unit 12 to communicate with various peripheral devices in a serial manner for information exchange.

In some embodiments of the present disclosure, the text picture information includes a plurality of pieces of information, and each piece of information includes picture information and page number information corresponding to the picture information;

the communication unit is further configured to receive the plurality of pieces of information; where there may or may not be a sequence for the reception;

the microcontroller unit is further configured to correspondingly convert the plurality of pieces of information into a plurality of pictures to be displayed;

the storage unit is further configured to store the plurality of pictures to be displayed, and corresponding storage areas of the plurality of pictures to be displayed in the storage unit are independent of each other;

the microcontroller unit is further configured to, according to a page-turning instruction from a user, read a picture to be displayed corresponding to the page-turning instruction from a corresponding storage area in the storage unit, and write the picture to be displayed corresponding to the page-turning instruction into the display unit for display.

Figure 2:
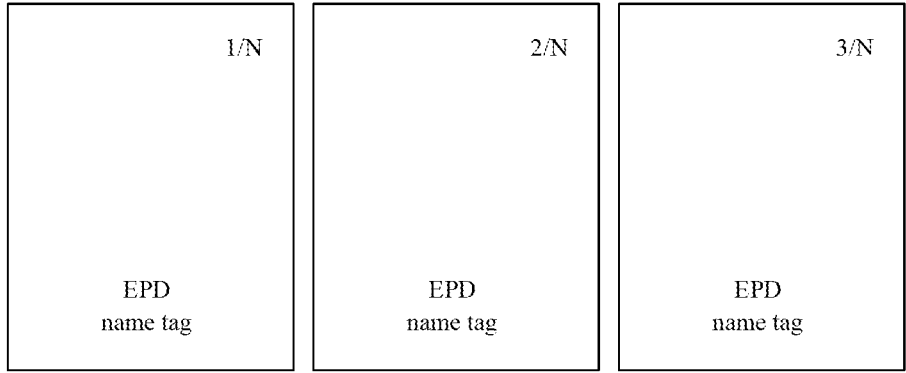
FIG. 2 is a schematic view showing a picture displayed by the Internet-of-Things terminal according to an embodiment of the present disclosure.

In the embodiment of the present disclosure, the Internet-of-Things server pushes the plurality of associated pictures to the Internet-of-Things terminal via the Internet-of-Things gateway, the picture information about the plurality of associated pictures forms the text picture information, the text picture information further includes the page number information corresponding to the picture information of each picture, and the text picture information is divided into a plurality of pieces of information, e.g., a first piece of information, a second piece of information, . . . , and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things gateway may transmit the plurality of pieces of information to the Internet-of-Things terminal, and the microcontroller unit is specifically configured to convert the plurality of pieces of information into a plurality of pictures to be displayed, respectively. A case where the Internet-of-Things terminal is an Electrophoretic display (EPD) name tag taken as an example, converted pictures to be displayed (a first picture, a second picture and a third picture) are shown in FIG. 2, and page number information may be displayed in a format of $n1/N$, where $n1$ represents a page number of a current picture, and N represents how many pictures are there in total. The page number information is capable of identifying the sequence number of the picture, and also identifying how many associated pictures are there in total, so as to enable a user to intuitively know whether there are associated pictures to be displayed later. The storage unit may sequentially store the plurality of pieces of information into corresponding addresses in the flash, different pieces of information have different addresses, and the storage unit further stores a corresponding relationship between each piece of information and an address. After the plurality of pieces of information have been received and stored, the microcontroller unit may read information about the first picture from the flash according to the address of each piece of information, write the same into the display unit for display, and perform refresh display on the first picture. After completing the refresh display of the first picture, in order to save the power consumption of the Internet-of-Things terminal, the Internet-of-Things terminal enters a standby low power consumption operation mode.

In some embodiments of the present disclosure, the microcontroller unit is further configured to determine whether the page-turning instruction is received after reading the picture to be displayed from the storage unit and writing the picture to be displayed into the display unit for display, and in response to that the page-turning instruction is not received, control the Internet-of-Things terminal to enter a low power consumption standby mode; in response to that the page-turning instruction is received, read a picture to be displayed corresponding to the page-turning instruction from the storage unit according to the page-turning instruction, and write the picture to be displayed corresponding to the page-turning instruction to the display unit for display.

When a user, such as a wearer of an EPD name tag, sees a first picture, and according to the total page number on the picture, knows how many pictures are stored in the flash. The wearer may send a page-turning instruction by means of pressing a key of the EPD name tag. After receiving the page-turning instruction, the microcontroller unit reads second picture data in the flash and writes the second picture data into the display unit for refresh display. In response to that the wearer presses the key of the EPD name tag again, refresh display of a third picture is performed. In response to that the wearer presses the key of the EPD name tag yet again, then refresh display of a fourth picture is performed, and so on, until refresh display of all the remaining pictures is completed. In response to that the page-turning instruction is not received, in order to save power consumption of the Internet-of-Things terminal, the Internet-of-Things terminal enters a standby low power consumption operation mode.

In some embodiments of the present disclosure, the storage unit is further configured to compare a current remaining storage capacity with a size of the picture to be displayed, and in response to that the current remaining storage capacity is less than the size of the picture to be displayed, erase information that is already stored until the current remaining storage capacity is not less than the size of the picture to be displayed.

In a specific example, the storage unit 13 may be the flash, and when the current remaining storage capacity is insufficient for storing the picture to be displayed, the flash may be erased until the picture to be displayed is capable of being stored.

Figure 3:
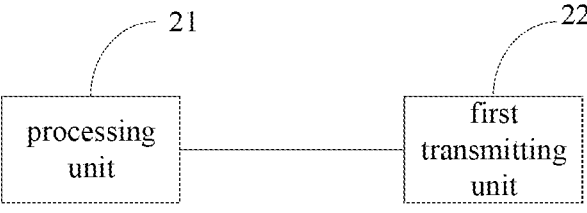
FIG. 3 is a schematic view showing an Internet-of-Things server according to an embodiment of the present disclosure.

The present disclosure further provides in some embodiments an Internet-of-Things server, as shown in FIG. 3, including:

a processing unit 21, configured to determine a plurality of associated pictures to be transmitted to an Internet-of-Things terminal, generate page number information corresponding to each picture according to a page number of each picture in the plurality of pictures, and synthesize the page number information and picture information of the picture to obtain text picture information; and a first transmitting unit 22, configured to transmit the text picture information and a physical address of the Internet-of-Things terminal to an Internet-of-Things gateway.

When the Internet-of-Things server needs to push the plurality of associated pictures to a certain Internet-of-Things terminal, the Internet-of-Things server program automatically adds page number information such as 1/N, 2/N, . . . , and so on into the pictures in the form of text, and then the Internet-of-Things server calls a corresponding conversion algorithm according to a resolution, a display type (such as a two-color of black and white screen, a three-color of black, white and red screen, etc.) and the like of the Internet-of-Things terminal, to convert color picture data into lattice data suitable for display on the Internet-of-Things terminal, i.e., synthesize the page number information and the picture information to obtain the text picture information.

In some embodiments of the present disclosure, the text picture information includes a plurality of pieces of information, and each piece of information includes picture information and page number information corresponding to the picture information. The first transmitting unit is further configured to transmit the plurality of pieces of information to the Internet-of-Things gateway sequentially according to the page number information.

In the embodiment of the present disclosure, the Internet-of-Things server pushes the plurality of associated pictures to the Internet-of-Things terminal via the Internet-of-Things gateway, the picture information about the plurality of associated pictures forms the text picture information, the text picture information further includes the page number information corresponding to the picture information of each picture, and the text picture information is divided into a plurality of pieces of information. e.g., a first piece of information, a second piece of information, . . . , and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things server may transmit the plurality of pieces of information to the Internet-of-Things gateway.

The present disclosure further provides in some embodiments an Internet-of-Things gateway, as shown in FIG. 4, including:

a receiving unit 31, configured to receive text picture information and a physical address of an Internet-of-Things terminal transmitted by an Internet-of-Things server;

a scanning unit 32, configured to scan a corresponding Internet-of-Things terminal according to the physical address of the Internet-of-Things terminal; and a second transmitting unit 33, configured to transmit the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures.

After receiving the physical address of the Internet-of-Things terminal, the Internet-of-Things gateway performs scanning according to the physical address of the Internet-of-Things terminal and sends a connection establishment request to the corresponding Internet-of-Things terminal. After establishing a connection with the Internet-of-Things terminal, the Internet-of-Things gateway forwards the text picture information transmitted by the Internet-of-Things server to the Internet-of-Things terminal.

In some embodiments of the present disclosure, the text picture information includes a plurality of pieces of information, and each piece of information includes picture information and page number information corresponding to the picture information. The second transmitting unit is further configured to transmit the plurality of pieces of information to the Internet-of-Things terminal sequentially according to the page number information.

In the embodiment of the present disclosure, the Internet-of-Things server pushes the plurality of associated pictures to the Internet-of-Things terminal via the Internet-of-Things gateway, the picture information about the plurality of associated pictures forms the text picture information, the text picture information further includes the page number information corresponding to the picture information of each picture, and the text picture information is divided into a plurality of pieces of information, e.g., a first piece of information, a second piece of information, . . . and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things gateway may transmit the plurality of pieces of information to the Internet-of-Things terminal according to the page number information.

The present disclosure provides in some embodiments a picture updating method applied to the above-mentioned Internet-of-Things terminal, as shown in FIG. 5, including the following steps.

Step 101, receiving, by a communication unit, text picture information transmitted by an Internet-of-Things gateway, where the text picture information includes synthesized picture information and page number information, and the page number information indicates a page number of a picture corresponding to the picture information in a plurality of associated pictures and a total page number of the plurality of associated pictures.

Step 102, converting, by a microcontroller unit, the text picture information into a picture to be displayed, where the picture to be displayed includes the page number information.

Step 103, storing, by a storage unit, the picture to be displayed.

Step 104, reading, by the microcontroller unit, the picture to be displayed from the storage unit and writing the picture to be displayed to the display unit for display.

In the embodiment of the present disclosure, the text picture information received by the communication unit includes the page number information, the microcontroller unit converts the text picture information received by the communication unit into the picture to be displayed and stores the same in the storage unit. Next, the microcontroller unit writes the picture to be displayed stored in the storage unit to the display unit for display, and the picture displayed by the display unit includes a picture having a page number. In this way, it is able for an Internet-of-Things user to know a sequence number of a currently displayed picture and how many associated pictures are there in addition to the currently displayed picture, so as to remind the user of other associated pictures without using a LED flashing indication, thereby to reduce the power consumption of the Internet-of-Things terminal and improve the standby time of the Internet-of-Things terminal. In the embodiment of the present disclosure, it may further be able to improve the user experience.

In a specific example, the communication unit 11 is a radio frequency chip, and may communicate with the Internet-of-Things gateway in a wireless manner, and receive the text picture information through the Internet-of-Things gateway interacting with the Internet-of-Things server. The Internet-of-Things gateway may perform a near field wireless communication, and may be connected to the Internet-of-Things server via a wireless network or a wired network.

The storage unit 13 is used for information storage and information buffering during the text picture information processing. The storage unit 13 may be implemented in various types of storage devices, and in some embodiments of the present disclosure, the storage unit 13 may be a flash, and a main characteristic of the flash is that the stored information may be maintained for a long time in a deenergized state. The flash is an EEPROM (Electrically Erasable Programmable Read Only Memory), has a high access speed, is easy to be erased and rewritten, has a small power consumption, and is applied to the Internet-of-Things terminal with low power consumption. The storage unit 13 is not limited to the flash, and may be an erasable programmable memory device in another type.

In some embodiments of the present disclosure, the display unit 14 is an electronic ink screen. The electronic ink screen has a small power consumption, and is applied to the Internet-of-Things terminal with low power consumption. The display unit 14 is not limited to the electronic ink screen, and may be a low power consumption display device in another type.

In the embodiment of the present disclosure, the microcontroller unit 12 may be connected to the communication unit 11 via a serial peripheral interface (SPI), the microcontroller unit 12 may be connected to the storage unit 13 via a serial peripheral interface (SPI), the microcontroller unit 12 may be connected to the display unit 14 via a serial peripheral interface, and the serial peripheral interface is a synchronous peripheral interface that enables the microcontroller unit 12 to communicate with various peripheral devices in a serial manner for information exchange.

In some embodiments of the present disclosure, the text picture information includes a plurality of pieces of information, and each piece of information includes picture information and page number information corresponding to the picture information; and the method specifically includes:

receiving, by the communication unit, the plurality of pieces of information; where there may or may not be a sequence for the reception;

converting. by the microcontroller unit, correspondingly the plurality of pieces of information into a plurality of pictures to be displayed;

storing, by the storage unit, the plurality of pictures to be displayed, where corresponding storage areas of the plurality of pictures to be displayed in the storage unit are independent of each other;

reading, by the microcontroller unit, according to a page-turning instruction from a user, a picture to be displayed corresponding to the page-turning instruction from a corresponding storage area in the storage unit, and writing the picture to be displayed corresponding to the page-turning instruction into the display unit for display.

In the embodiment of the present disclosure, the Internet-of-Things server pushes the plurality of associated pictures to the Internet-of-Things terminal via an Internet-of-Things gateway, the picture information about the plurality of associated pictures forms the text picture information, the text picture information further includes the page number information corresponding to the picture information of each picture, and the text picture information is divided into a plurality of pieces of information, e.g., a first piece of information, a second piece of information, . . . , and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things gateway may transmit the plurality of pieces of information to the Internet-of-Things terminal, and the microcontroller unit is specifically configured to convert the plurality of pieces of information into a plurality of pictures to be displayed, respectively. A case where the Internet-of-Things terminal is an Electrophoretic display (EPD) name tag taken as an example, converted pictures to be displayed (a first picture, a second picture and a third picture) are shown in FIG. 2, and page number information may be displayed in a format of n1/N, where n1 represents a page number of a current picture, and N represents how many pictures are there in total. The page number information is capable of identifying the sequence number of the picture, and also identifying how many associated pictures are there in total, so as to enable a user to intuitively know whether there are associated pictures to be displayed later. The storage unit may sequentially store the plurality of pieces of information into corresponding addresses in the flash, different pieces of information have different addresses, and the storage unit further stores a corresponding relationship between each piece of information and an address. After the plurality of pieces of information have been received and stored, the microcontroller unit may read information about the first picture from the flash according to the address of each piece of information, write the same into the display unit for display, and perform refresh display on the first picture. After completing the refresh display of the first picture, in order to save the power consumption of the Internet-of-Things terminal, the Internet-of-Things terminal enters a standby low power consumption operation mode.

In some embodiments of the present disclosure, the method further includes: determining, by the microcontroller unit, whether the page-turning instruction is received, and in response to that the page-turning instruction is not received, controlling the Internet-of-Things terminal to enter a low power consumption standby mode; in response to that the page-turning instruction is received, reading a picture to be displayed corresponding to the page-turning instruction from the storage unit according to the page-turning instruction, and writing the picture to be displayed corresponding to the page-turning instruction to the display unit for display.

When a user, such as a wearer of an EPD (electrophoretic electronic paper display) name tag, sees a first picture, and according to the total page number on the picture, knows how many pictures are stored in the flash. The wearer may send a page-turning instruction by means of pressing a key of the EPD name tag. After receiving the page-turning instruction, the microcontroller unit reads second picture data in the flash and writes the second picture data into the display unit for refresh display. In response to that the wearer presses the key of the EPD name tag again, refresh display of a third picture is performed. In response to that the wearer presses the key of the EPD name tag yet again, then refresh display of a fourth picture is performed, and so on, until refresh display of all the remaining pictures is completed. In response to that the page-turning instruction is not received, in order to save power consumption of the Internet-of-Things terminal, the Internet-of-Things terminal enters a standby low power consumption operation mode.

In some embodiments of the present disclosure, the method further includes: comparing, by the storage unit, a current remaining storage capacity with a size of the picture to be displayed, and in response to that the current remaining storage capacity is less than the size of the picture to be displayed, erasing information that is already stored until the current remaining storage capacity is not less than the size of the picture to be displayed.

The present disclosure further provides in some embodiments a picture updating method applied to the above-mentioned Internet-of-Things server, as shown in FIG. 6, the picture updating method including the following steps.

Step 201, determining, by a processing unit, a plurality of associated pictures to be transmitted to an Internet-of-Things terminal, generating page number information corresponding to each picture according to a page number of each picture in the plurality of pictures, and synthesizing the page number information and picture information of the picture to obtain text picture information.

Step 202, transmitting, by a first transmitting unit, the text picture information and a physical address of the Internet-of-Things terminal to an Internet-of-Things gateway.

When the Internet-of-Things server needs to push the plurality of associated pictures to a certain Internet-of-Things terminal, the Internet-of-Things server program automatically adds page number information such as 1/N, 2/N, . . . , and so on into the pictures in the form of text, and then the Internet-of-Things server calls a corresponding conversion algorithm according to a resolution, a display type (such as a two-color of black and white screen, a three-color of black, white and red screen, etc.) and the like of the Internet-of-Things terminal, to convert color picture data into lattice data suitable for display on the Internet-of-Things terminal, namely, synthesize the page number information and the picture information to obtain the text picture information.

In some embodiments of the present disclosure, the text picture information includes a plurality of pieces of information, each piece of information includes picture information and page number information corresponding to the picture information, and the method specifically includes: transmitting, by the first transmitting unit, the plurality of pieces of information to the Internet-of-Things gateway sequentially according to the page number information.

In the embodiment of the present disclosure, the Internet-of-Things server pushes the plurality of associated pictures to the Internet-of-Things terminal via the Internet-of-Things gateway, the picture information about the plurality of associated pictures forms the text picture information, the text picture information further includes the page number information corresponding to the picture information of each picture, and the text picture information is divided into a plurality of pieces of information, e.g., a first piece of information, a second piece of information, . . . , and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things server may transmit the plurality of pieces of information to the Internet-of-Things gateway according to the page number information.

The present disclosure further provides in some embodiments a picture updating method applied to the above-mentioned Internet-of-Things gateway, as shown in FIG. 7, the picture updating method including the following steps.

Step 301: receiving, by a receiving unit, text picture information and a physical address of an Internet-of-Things terminal transmitted by an Internet-of-Things server.

Step 302: scanning, by a scanning unit, a corresponding Internet-of-Things terminal according to the physical address of the Internet-of-Things terminal.

Step 303: transmitting, by a second transmitting unit, the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and a total page number of the plurality of associated pictures.

After receiving the physical address of the Internet-of-Things terminal, the Internet-of-Things gateway performs scanning according to the physical address of the Internet-of-Things terminal and sends a connection establishment request to the corresponding Internet-of-Things terminal. After establishing a connection with the Internet-of-Things terminal, the Internet-of-Things gateway forwards the text picture information transmitted by the Internet-of-Things server to the Internet-of-Things terminal.

In some embodiments of the present disclosure, the text picture information includes a plurality of pieces of information, and each piece of information includes picture information and page number information corresponding to the picture information. The method specifically includes: transmitting, by the second transmitting unit, the plurality of pieces of information to the Internet-of-Things terminal sequentially according to the page number information.

In the embodiment of the present disclosure, the Internet-of-Things server pushes the plurality of associated pictures to the Internet-of-Things terminal via the Internet-of-Things gateway, the picture information about the plurality of associated pictures forms the text picture information, the text picture information further includes the page number information corresponding to the picture information of each picture, and the text picture information is divided into a plurality of pieces of information, e.g., a first piece of information, a second piece of information, . . . and an N-th piece of information. The first piece of information includes picture information of a first picture and page number information of the first picture, the second piece of information includes picture information of a second picture and page number information of the second picture, . . . , and the N-th piece of information includes picture information of an N-th picture and page number information of the N-th picture. The Internet-of-Things gateway may transmit the plurality of pieces of information to the Internet-of-Things terminal according to the page number information.

The present disclosure further provides in some embodiments an Internet-of-Things system, including:

an Internet-of-Things server, configured to determine a plurality of associated pictures to be transmitted to an Internet-of-Things terminal, generate page number information corresponding to each picture according to a page number of each picture in the plurality of pictures, and synthesize the page number information and picture information of the picture to obtain text picture information; and transmit the text picture information and a physical address of the Internet-of-Things terminal to an Internet-of-Things gateway;

an Internet-of-Things gateway, configured to receive text picture information and a physical address of an Internet-of-Things terminal transmitted by an Internet-of-Things server; scanning a corresponding Internet-of-Things terminal according to the physical address of the Internet-of-Things terminal; and transmit the text picture information to the Internet-of-Things terminal after establishing a connection with the Internet-of-Things terminal, where the text picture information includes synthesized picture information and page number information, and the page number information indicates a page number of a picture corresponding to the picture information in a plurality of associated pictures and the total page number of the plurality of associated pictures; and an Internet-of-Things terminal, configured to receive text picture information transmitted by the Internet-of-Things gateway, where the text picture information includes synthesized picture information and page number information, and the page number information indicates the page number of the picture corresponding to the picture information in the plurality of associated pictures and the total page number of the plurality of associated pictures; convert the text picture information into a picture to be displayed, where the picture to be displayed includes the page number information; store the picture to be displayed; and read the picture to be displayed for display.

In a specific example, as shown in FIG. 8, a case where the Internet-of-Things terminal is an EPD name tag taken as an example, when the Internet-of-Things system performs picture updating, the following procedure is implemented.

Step 401, when the Internet-of-Things server needs to push a plurality of pieces of picture information to a certain EPD name tag, the Internet-of-Things server generates fixed lattice information from the page number information such as 1/N, 2/N, . . . , and so on according to a display resolution and a character size of the EPD name tag.

Step 402, the Internet-of-Things server performs an OR operation on the page number lattice information and corresponding picture information according to a fixed position where the page number is displayed on the picture, i.e., synthesizes the page number information and the picture information to obtain text picture information.

When the Internet-of-Things server needs to push the plurality of associated pictures to a certain Internet-of-Things terminal, the Internet-of-Things server program automatically adds page number information such as 1/N, 2/N, . . . , and so on to the pictures in the form of text, and then the Internet-of-Things server calls a corresponding conversion algorithm according to the resolution, a display type (such as a two-color of black and white screen, a three-color of black, white and red screen, etc.) and the like of the Internet-of-Things terminal, to convert color picture data into lattice data suitable for display on the Internet-of-Things terminal, namely, synthesize the page number information and the picture information to obtain the text picture information.

Step 403, the Internet-of-Things server sends an MAC address of the EPD name tag and the synthesized text picture information to the corresponding Internet-of-Things gateway.

Step 404, the Internet-of-Things gateway establishes a connection with the EPD name tag according to the received MAC address, and sends the text picture information to the EPD name tag.

Step 405, the EPD name tag erases the flash, and sequentially stores the received text picture information into a corresponding address in the flash.

Step 406, the EPD name tag stores the received text picture information about the plurality of pictures, reads text picture information about a first picture from the flash according to the address, writes the same into a register of the EPD name tag, and performs refresh display on the first picture. After performing refresh display on the first picture, the EPD name tag enters a standby low power consumption working mode.

Step 407, a page-turning instruction of a wearer of the EPD name tag is received, text picture information about a second picture in the flash is read and written into the register of the EPD, and refresh display of the second picture is performed.

When the wearer of the EPD name tag sees the first picture, and according to the total page number on the picture, knows how many pictures are stored in the flash, and the wearer sends a page-turning instruction by pressing the key of the EPD name tag.

Next, the wearer of the EPD name tag may send a page-turning instruction again by pressing the key, and the EPD name tag sequentially displays the third picture, the fourth picture, and so on until the N-th picture is displayed. After finishing the display, the EPD name tag enters the standby operation mode.

In the embodiment of the present disclosure, the picture displayed on the EPD name tag includes the page number of the picture, so it is able for the wearer of the EPD name tag to know the sequence number of the currently displayed picture and how many associated pictures are there in addition to the currently displayed picture, so as to remind the wearer of the EPD name tag of other associated pictures without using a LED flashing indication, thereby to reduce the power consumption of the EPD name tag and improve the standby time of the EPD name tag. In the embodiment of the present disclosure, it may further be able to improve the experience of the wearer of the EPD name tag. The Internet-of-Things terminal is not limited to the EPD name tag, but may also be a hospital bedside card, a ward doorplate, a conference doorplate, etc.

In the embodiments of that present disclosure, modules, units or subunits may be implemented by software to be executed by various types of processors. For example, an identified executable code module may include one or more physical or logical blocks including computer instructions, which may be constructed as an object, process, or function, for example. However, an executable code of the identified module does not need to be physically located together, but may include different instructions stored in different locations that, in a case that the different instructions are logically combined, the instructions constitute the modules and achieve the specified purpose of the module.

A corresponding hardware circuit may be designed by a person skilled in the art to realize the modules, units or subunits, without considering a cost. The hardware circuit includes a conventional Very Large Scale Integrated (VLSI) circuit or a gate array and a related semiconductor such as a logic chip, a transistor, or other discrete elements.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above are merely specific embodiments of the present disclosure, but a scope of the present disclosure is not limited thereto. Any modifications or replacements that would easily occurred to a person skilled in the art, without departing from the technical scope disclosed in the disclosure, should be encompassed in the scope of the present disclosure. Therefore, the scope of the present disclosure shall be subject to the scope defined by the appended claims.

What is claimed is:

1. An Internet-of-Things terminal, comprising:
   a communication unit, configured to receive text picture information transmitted by an Internet-of-Things gateway, wherein the text picture information comprises synthesizing picture information and page number information, and the page number information indicates a page number of a picture corresponding to the picture information in a plurality of associated pictures and a total page number of the plurality of associated pictures;
   a microcontroller unit, connected to the communication unit and configured to convert the text picture information into a picture to be displayed, wherein the picture to be displayed comprises the page number information;
   a storage unit, connected to the microcontroller unit and configured to store the picture to be displayed; and
   a display unit, connected to the microcontroller unit;
   wherein the microcontroller unit is further configured to read the picture to be displayed from the storage unit and write the picture to be displayed to the display unit for display;
   wherein the text picture information comprises a plurality of pieces of information, and each piece of information comprises picture information and page number information corresponding to the picture information;
   wherein the storage unit is further configured to compare a current remaining storage capacity with a size of the picture to be displayed, and in response to that the current remaining storage capacity is less than the size of the picture to be displayed, erase information that is already stored until the current remaining storage capacity is not less than the size of the picture to be displayed;
   wherein the page number information is used to generate fixed lattice information;
   the page number of the picture and the total page number of the plurality of associated pictures are displayed on a fixed position of the picture; and
   the synthesizing picture information and page number information comprises lattice data generated according to conversion algorithm corresponding to resolution, a display type of the Internet-of-Things terminal.

2. The Internet-of-Things terminal according to claim 1, wherein
   the communication unit is further configured to receive the plurality of pieces of information;
   the microcontroller unit is further configured to correspondingly convert the plurality of pieces of information into a plurality of pictures to be displayed;
   the storage unit is further configured to store the plurality of pictures to be displayed, and corresponding storage areas of the plurality of pictures to be displayed in the storage unit are independent of each other;
   the microcontroller unit is further configured to, according to a page-turning instruction from a user, read a picture to be displayed corresponding to the page-turning instruction from a corresponding storage area in the storage unit, and write the picture to be displayed corresponding to the page-turning instruction into the display unit for display.

3. The Internet-of-Things terminal according to claim 2, wherein the microcontroller unit is further configured to determine whether the page-turning instruction is received after reading the picture to be displayed from the storage unit and writing the picture to be displayed into the display unit for display, and in response to that the page-turning instruction is not received, control the Internet-of-Things terminal to enter a low power consumption standby mode; in response to that the page-turning instruction is received, read a picture to be displayed corresponding to the page-turning instruction from the storage unit according to the page-turning instruction, and write the picture to be displayed corresponding to the page-turning instruction to the display unit for display.

4. A picture updating method, applied to the Internet-of-Things terminal according to claim 1, the picture updating method comprising:

receiving, by a communication unit, text picture information transmitted by an Internet-of-Things gateway, wherein the text picture information comprises synthesizing picture information and page number information, and the page number information indicates a page number of a picture corresponding to the picture information in a plurality of associated pictures and a total page number of the plurality of associated pictures;

converting, by a microcontroller unit, the text picture information into a picture to be displayed, wherein the picture to be displayed comprises the page number information;

storing, by a storage unit, the picture to be displayed; and reading, by the microcontroller unit, the picture to be displayed from the storage unit and writing the picture to be displayed to the display unit for display;

wherein the method further comprises: comparing, by the storage unit, a current remaining storage capacity with a size of the picture to be displayed, and in response to that the current remaining storage capacity is less than the size of the picture to be displayed, erasing information that is already stored until the current remaining storage capacity is not less than the size of the picture to be displayed.

5. The method according to claim 4, further comprising:

receiving, by the communication unit, the plurality of pieces of information;

converting, by the microcontroller unit, correspondingly the plurality of pieces of information into a plurality of pictures to be displayed;

storing, by the storage unit, the plurality of pictures to be displayed, wherein corresponding storage areas of the plurality of pictures to be displayed in the storage unit are independent of each other;

reading, by the microcontroller unit, according to a page-turning instruction from a user, a picture to be displayed corresponding to the page-turning instruction from a corresponding storage area in the storage unit, and writing the picture to be displayed corresponding to the page-turning instruction into the display unit for display.

6. The method according to claim 4, further comprising:

determining, by the microcontroller unit, whether the page-turning instruction is received, and in response to that the page-turning instruction is not received, controlling the Internet-of-Things terminal to enter a low power consumption standby mode; in response to that the page-turning instruction is received, reading a picture to be displayed corresponding to the page-turning instruction from the storage unit according to the page-turning instruction, and writing the picture to be displayed corresponding to the page-turning instruction to the display unit for display.

7. A picture updating method, applied to an Internet-of-Things server, wherein the picture updating method comprising:

determining, a plurality of associated pictures to be transmitted to an Internet-of-Things terminal, generating page number information corresponding to each picture according to a page number of each picture in the plurality of pictures, and synthesizing the page number information and picture information of the picture to obtain text picture information; and transmitting, the text picture information and a physical address of the Internet-of-Things terminal to an Internet-of-Things gateway;

wherein the text picture information comprises a plurality of pieces of information, and each piece of information comprises picture information and page number information corresponding to the picture information;

wherein the page number information is used to generate fixed lattice information;

the page number of the picture and the total page number of the plurality of associated pictures are displayed on a fixed position of the picture; and the synthesizing picture information and page number information comprises lattice data generated according to conversion algorithm corresponding to resolution, a display type of the Internet-of-Things terminal.

8. The method according to claim 7, further comprising: transmitting the plurality of pieces of information to the Internet-of-Things gateway sequentially according to the page number information.

9. An Internet-of-Things system, comprising:

an Internet-of-Things server, configured to determine a plurality of associated pictures to be transmitted to an Internet-of-Things terminal, generate page number information corresponding to each picture according to a page number of each picture in the plurality of pictures, and synthesize the page number information and picture information of the picture to obtain text picture information; and transmit the text picture information and a physical address of the Internet-of-Things terminal to an Internet-of-Things gateway;

an Internet-of-Things gateway, configured to receive text picture information and a physical address of an Internet-of-Things terminal transmitted by an Internet-of-Things server; scan a corresponding Internet-of-Things terminal according to the physical address of the Internet-of-Things terminal; and transmit the text picture information to the Internet-of-Things terminal after establishing a connection with the Internet-of-Things terminal, wherein the text picture information comprises synthesizing picture information and page number information, and the page number information indicates a page number of a picture corresponding to the picture information in a plurality of associated pictures and a total page number of the plurality of associated pictures; and an Internet-of-Things terminal, configured to receive text picture information transmitted by the Internet-of-Things gateway, wherein the text picture information comprises the synthesizing picture information and page number information, and the page number information indicates the page number of the picture corresponding to the picture information in the plurality of associated pictures and the total page number of the plurality of associated pictures; convert the text picture information into a picture to be displayed, wherein the picture to be displayed comprises the page number information; store the picture to be displayed; and read the picture to be displayed for display;

wherein the Internet-of-Things gateway is further configured to compare a current remaining storage capacity with a size of the picture to be displayed, and in response to that the current remaining storage capacity is less than the size of the picture to be displayed, erase information that is already stored until the current remaining storage capacity is not less than the size of the picture to be displayed;

wherein the text picture information comprises a plurality of pieces of information, and each piece of information comprises picture information and page number information corresponding to the picture information;

wherein the page number information is used to generate fixed lattice information;

the page number of the picture and the total page number of the plurality of associated pictures are displayed on a fixed position of the picture; and the synthesizing picture information and page number information comprises lattice data generated according to conversion algorithm corresponding to resolution, a display type of the Internet-of-Things terminal.

10. The system according to claim 9, wherein the Internet-of-Things server transmits the plurality of pieces of information to the Internet-of-Things gateway sequentially according to the page number information.

11. The system according to claim 9, wherein the Internet-of-Things gateway transmits the plurality of pieces of information to the Internet-of-Things terminal sequentially according to the page number information.

\* \* \* \* \*